United States Patent
Flöter et al.

(10) Patent No.: US 11,272,717 B2
(45) Date of Patent: Mar. 15, 2022

(54) EDIBLE WATER-IN-OIL EMULSION AND A PROCESS FOR PREPARING SUCH EMULSION

(71) Applicant: Upfield US Inc., Englewood Cliffs, NJ (US)

(72) Inventors: Eckhard Flöter, Kleinmachnow (DE); Teunis de Man, Maassluis (NL); Henelyta Santos Ribeiro, Asselheim (DE)

(73) Assignee: UPFIELD EUROPE B.V., Rotterdam (NL)

( * ) Notice: Subject to any disclaimer, the term of this patent is extended or adjusted under 35 U.S.C. 154(b) by 1848 days.

(21) Appl. No.: 14/429,389

(22) PCT Filed: Sep. 11, 2013

(86) PCT No.: PCT/EP2013/068773
§ 371 (c)(1),
(2) Date: Mar. 19, 2015

(87) PCT Pub. No.: WO2014/044582
PCT Pub. Date: Mar. 27, 2014

(65) Prior Publication Data
US 2015/0208683 A1 Jul. 30, 2015

(30) Foreign Application Priority Data
Sep. 21, 2012 (EP) ..................................... 12185410

(51) Int. Cl.
*A23D 7/02* (2006.01)
*A23D 7/00* (2006.01)
*A23D 7/005* (2006.01)

(52) U.S. Cl.
CPC ............. *A23D 7/005* (2013.01); *A23D 7/001* (2013.01); *A23D 7/003* (2013.01); *A23D 7/02* (2013.01)

(58) Field of Classification Search
CPC .......... A23D 7/001; A23D 7/02; A23D 7/003; A23D 7/005
See application file for complete search history.

(56) References Cited

U.S. PATENT DOCUMENTS

| | | | | |
|---|---|---|---|---|
| 4,305,970 A * | 12/1981 | Moran | ................... | A23D 7/015 426/573 |
| 4,533,561 A | 8/1985 | Ward | | |
| 5,834,043 A | 11/1998 | Van Den Berg et al. | | |
| 6,056,791 A | 5/2000 | Weidner et al. | | |
| 6,231,914 B1 | 5/2001 | Huizinga et al. | | |
| 2005/0276900 A1 * | 12/2005 | Ullanoormadam | ...... | A23D 9/00 426/601 |
| 2006/0280855 A1 | 12/2006 | Van Den Berg et al. | | |
| 2007/0141123 A1 | 6/2007 | Zawistowski | | |
| 2008/0254193 A1 | 10/2008 | Edelman et al. | | |
| 2011/0293812 A1 * | 12/2011 | Dobenesque | ........ | A23D 7/0056 426/573 |

FOREIGN PATENT DOCUMENTS

| | | |
|---|---|---|
| EP | 0101105 | 2/1984 |
| EP | 0264149 | 4/1988 |
| EP | 0304131 | 2/1989 |
| EP | 0564738 | 10/1993 |
| EP | 0744992 | 10/1997 |
| EP | 1114674 | 9/2008 |
| EP | 1285584 | 11/2009 |
| EP | 2181604 | 5/2010 |
| EP | 1651338 | 5/2011 |
| EP | 2362736 | 12/2012 |

(Continued)

OTHER PUBLICATIONS

Weiss et al., "Factors Affecting the Droplet Size of Water-in-Oil Emulsions (W/O) and the oil globule size in water-in-oil-in-water emulsions (W-O-W)" Journal of Dispersion Science and Technology, 28: 703-716 (2007). (Year: 2007).*
Raikar., "Prediction and Manipulation of Drop Size Distribution of Emulsions Using Population Balance Equation Models for High-Pressure Homogenization" from Https://scholarworks.umass.edu/open_access_dissertations (Year: 2010).*
Experimental and Analytical Facilities, Delft University of Technology, Dec. 16, 2005, pp. 41-51.
IPRP2 in PCTEP2013068184, Dec. 23, 2014.
Margarines and Shortenings, Ullmanns Encyclopedia of Industrial Chemistry, 1990, pp. 156-158, vol. A16.
P. Munuklu, Particle formation of edible fats using the supercritical melt micronization process (ScMM), The Journal of Supercritical Fluids, 2007, pp. 181-190, 43.

(Continued)

*Primary Examiner* — Erik Kashnikow
*Assistant Examiner* — Assaf Zilbering
(74) *Attorney, Agent, or Firm* — Arent Fox LLP

(57) ABSTRACT

The invention relates to an edible water-in-oil emulsion comprising a fat-phase comprising a first hardstock and a second hardstock, wherein said fat-phase has a total amount of hardstock of from 2 to 60 wt. %, based on the total weight of the fat-phase, and a water-phase, wherein part of the water-phase is dispersed as droplets, wherein the droplets are stabilized by said first hardstock; and wherein part of the water-phase is dispersed as droplets, wherein the droplets are stabilized by said second hardstock, wherein said first hardstock comprises more than 25% of HHH-triglycerides, and a combined amount of H2U and H2M triglycerides of not more than 110% of the HHH-triglycerides of said first hardstock, wherein said second hardstock comprises less than 22% of HHH-triglycerides, and a combined amount of H2U and H2M triglycerides of more than 140% of the HHH-triglycerides of said second hardstock, wherein H denotes saturated chains with 16 or more carbon atoms or an elaidic acid residue, wherein U denotes unsaturated chains and wherein M denotes saturated chains with 14 or less carbon atoms. The invention further relates to a process for the manufacture of such edible water-in-oil emulsions.

20 Claims, No Drawings

(56) References Cited

FOREIGN PATENT DOCUMENTS

| WO | WO0105241 | 1/2001 |
|----|-----------|--------|
| WO | WO2005014158 | 2/2005 |
| WO | WO2006079445 | 8/2006 |
| WO | WO2006087090 | 8/2006 |
| WO | WO2006087091 | 8/2006 |
| WO | WO2006087092 | 8/2006 |
| WO | WO2006087093 | 8/2006 |
| WO | WO2010053360 | 5/2010 |
| WO | WO2010069746 | 6/2010 |
| WO | WO2010069747 | 6/2010 |
| WO | WO2010069750 | 6/2010 |
| WO | WO2010069751 | 6/2010 |
| WO | WO2010069752 | 6/2010 |
| WO | WO2010069753 | 6/2010 |
| WO | WO2011160921 | 12/2011 |

OTHER PUBLICATIONS

S. P. Kochhar, Influence of Processing on Sterols of Edible Vegetable Oils, Prog Lipid Res, 1983, pp. 161-188, vol. 22.
Search Report in EP12185410, dated Feb. 26, 2013.
Search Report in EP12185433, dated Mar. 6, 2013, EP.
Search Report in PCTEP2013068184, dated Oct. 14, 2013, WO.
Search Report in PCTEP2013068773, dated Oct. 24, 2013.
Van Den Enden et al., A Method for the Determination of the Solid Phase Content of Fats Using Pulse Nuclear Magnetic Resonance, Fette Seifen Anstrichmittel, 1978, pp. 180-186, vol. 80.
Written Opinion in EP12185433, dated Mar. 6, 2013, EP.
Written Opinion in PCTEP2013068184, dated Sep. 5, 2014.
Written Opinion in PCTEP2013068773, dated Oct. 24, 2013.
Written Opinion in EP13758844, dated Mar. 21, 2017.

* cited by examiner

EDIBLE WATER-IN-OIL EMULSION AND A PROCESS FOR PREPARING SUCH EMULSION

FIELD OF INVENTION

The present invention relates to water-in-oil emulsions comprising droplets stabilized by a first hardstock and droplets stabilized by a second hardstock.

The invention also provides a process for the manufacture of such emulsions.

BACKGROUND OF INVENTION

Edible fat continuous water-in-oil emulsions like e.g. margarine and low fat spreads are well known food products that comprise a continuous fat-phase and a dispersed water-phase.

Margarine is generally defined as a composition containing at least 80 wt. % fat and about 20 wt. % of a water-phase. In contrast, emulsions containing less than 80 wt. % fat are generally called spreads. Nowadays the terms margarine and spread are often used interchangeably although in some countries the commercial use of the term margarine is subject to certain regulatory requirements. The main difference between margarine and spread is the amount of fat. Therefore, for the purpose of the present invention the terms margarine and spread will be used interchangeably.

Margarine may be used for different applications including spreading, (shallow) frying and baking. In the market place margarine is generally sold as one of three principal types, namely hard or stick margarine (generally referred to as wrapper margarine), soft or tub margarine and liquid or pourable margarine. Wrapper margarine would typically have a Stevens hardness value of more than 140 gram at 5 degrees Celsius and more than 50 gram at 20 degrees Celsius. Tub margarine would typically have a Stevens hardness value of 20 to 140 gram at 5 degrees Celsius and 10 to 20 gram at 20 degrees Celsius. Liquid margarine would typically have a Bostwick value of at least 4 at 15° C., preferably a Bostwick value of at least 7.

The fat-phase of margarine and similar edible fat continuous spreads comprises a mixture of liquid oil (i.e. fat that is liquid at ambient temperature) and fat which is solid at ambient temperature. The liquid oil fraction typically comprises liquid unmodified vegetable oil such as soybean oil, sunflower oil, linseed oil, low erucic rapeseed oil (Canola), corn oil (maize oil) and blends of vegetable oils.

Generally, edible fat continuous food products like for example margarines and similar edible fat continuous spreads are prepared according to known processes that encompass the following steps:
1. Mixing of the liquid oil, the structuring fat and if present the water-phase at a temperature at which the structuring fat is definitely liquid;
2. cooling of the mixture under high shear to induce crystallization of the structuring fat to create an emulsion;
3. formation of a fat crystal network to stabilize the resulting emulsion and give the product some degree of firmness;
4. modification of the crystal network to produce the desired firmness, confer plasticity and reduce the water droplet size.

These steps are usually conducted in a process that involves apparatus that allow heating, cooling and mechanical working of the ingredients, such as the churn process or the votator process. The churn process and the votator process are described in the Ullmans Encyclopedia, Fifth Edition, Volume A 16, pages 156-158.

For an edible water-in-oil emulsion, ideally the structuring fat has such properties that it melts or dissolves at in-mouth conditions, otherwise the product may have a heavy and/or waxy mouthfeel. An important indicator is the temperature at which a water-in-oil emulsion breaks up. Preferably the water-in-oil emulsion breaks up at in-mouth conditions to provide a good oral response. Furthermore, the overall organoleptic impression should be smooth and preferable no perceivable grains should be present upon ingestion as this may result in what is generally known as a 'sandy', 'grainy' and/or 'lumpy' mouthfeel.

Other important aspects of an edible water-in-oil emulsion are for example hardness, spreadability and stability (e.g. storage stability and the ability to withstand temperature cycling). Temperature cycling means that the product is subjected to low and high temperatures (e.g. when the consumer takes the product out of the refrigerator and leaves it for some time at the table prior to use). An inadequate stability may for example lead to destabilization of the emulsion, oil-exudation and/or crystal growth.

The solid fat, also called structuring fat or hardstock fat, serves to structure the fat-phase by forming a fat crystal network. It also helps to stabilize the emulsion. The droplets of the water-phase are fixed within the spaces of the lattice of solid fat crystals. This prevents coalescence of the droplets and separation of the heavier water-phase from the fat-phase.

The stability of the emulsion depends at least in part on the amount of hardstock and the triglyceride composition of the hardstock. Structuring fat by its very nature contains a relatively high amount of saturated fatty acids (SAFA) as the SAFA is responsible for the structuring capacity of the structuring fat. A better stability, however normally leads to a deterioration of the oral response. This is because the oral response largely depends on the melting behaviour of the fat-phase. Although the applicant does not wish to be bound by theory, it is believed that on the one hand the stability and on the other hand oral response do not go well together because the requirement of stability normally leads to the formulation of fat blends containing relatively high amounts of higher melting triglycerides. These higher melting triglycerides are believed to be responsible for the deterioration of oral response.

In most conventional fat products, such as those made by the votator process, shortly after production, the high melting triglycerides are crystallized in mixed crystals, having incorporated therein certain amounts of the lower melting triglycerides. In a well formulated blend the melting point of the mixed crystals is close to mouth temperature. In the mouth a fat product containing such a blend will melt entirely, whereby, since the water-in-oil emulsion is no longer stabilized, the water-phase together with other compounds which may be present therein, such as proteins, thickeners, salt and flavour compounds, are released.

However, when conventional fat products are subjected to temperature cycling, which may for example occur during storage, transport and use (e.g. taking the product in and out of the fridge), the mixed crystals demix, and a separate, more pure fraction of the higher melting triglycerides crystallizes, partially in the form of shells, surrounding and stabilizing water droplets. In the mouth these water droplets remain stabilized by these high melting fat crystals, and consequently the flavour compounds therein will not be released. Conventional products displaying good stability typically combine this property with a poor oral response.

EP 0 264 149 discloses a process for the manufacture of water-in-oil emulsions which combine good stability with good oral response. The process involves mixing a water-in-oil emulsion with a fat blend, wherein the fat blend has a slip melting point above that of the water-in-oil emulsion.

EP 0 304 131 discloses water-in-oil emulsions which combine good stability with good oral response comprising at least 5 wt. %, calculated by weight of the total amount of fat, of indigestible polyol fatty acid polyesters and being characterized by at least one fat peak above 36 degrees Celsius and at least one fat peak below 36 degrees Celsius as shown in a differential scanning calorimetry curve. The process involves mixing of a water-in-oil emulsion with a second fat-phase, wherein the second fat-phase comprises the polyol fatty acid polyesters.

Both EP 0 264 149 and EP 0 304 131 mention that the products have a good oral response because release of the water droplets is not hindered by the presence of a shell of high melting fat crystals surrounding the water droplets. The high melting triglycerides are present in the form of a network in the continuous oil-phase providing stability.

However, the presence of a network of high-melting triglycerides in the continuous oil phase may lead to a heavy or waxy mouthfeel (i.e. waxiness) by inhibiting sufficient break-up of the oil-phase in the mouth. At in-mouth conditions the oil is retained in the matrix of high-melting crystals forming a waxy or chewy texture which does not properly liquefy in the mouth.

The dispersed water-phase may comprise compounds to improve human health and well-being many of which unfortunately have an undesirable taste, such as a bitter or metallic flavour. The undesirable taste may be due to the compounds themselves or due to products released in reaction with other compounds. Examples of such compounds are essential minerals and vitamins, caffeine and flavonoids. It is not always desirable for such flavours to be released in the mouth upon consumption of the water-in-oil emulsion. One option to reduce the release of undesirable taste of compounds is to encapsulate them to prevent their contact with the mouth or other ingredients. A drawback of encapsulation is that a suitable encapsulate should be found that works well in a water-in-oil emulsion (e.g. does not have a noticeable grainy texture). Another drawback is that encapsulates are often more expensive than the bare ingredient itself.

The dispersed water-phase may comprise compounds which impart flavour (i.e. have a desirable taste) many of which unfortunately are expensive and/or unhealthy. For example, sodium chloride is an important flavour component of many W/O emulsions, but when consumed in excessive amounts may lead to a high blood pressure.

It is an object of the present invention to provide water-in-oil emulsions which have a low waxiness, are stable and have a good oral response.

It is a further object of the present invention to provide water-in-oil emulsions which have a low waxiness and are capable of selectively releasing part of the water-phase at in-mouth conditions.

It is a further object of the present invention to provide water-in-oil emulsions which have a low waxiness and are capable of reducing the release of compounds having an undesirable taste and/or are capable enhancing the taste of compounds having a desirable taste at in-mouth conditions.

SUMMARY OF THE INVENTION

The inventors have found that one or more of the above objectives is achieved by a W/O emulsion comprising water droplets stabilized by a low melting hardstock and comprising water droplets stabilized by a high melting hardstock. These W/O emulsions have excellent stability and little or no waxiness. In addition, these emulsions allow for the selective release and/or suppression of flavour compounds at in-mouth conditions while having little or no waxiness. Furthermore, these emulsions allow for the selective taste enhancement of desirable flavours. The release of desirable flavour by a W/O emulsion at in-mouth conditions is defined as providing a good oral response.

Accordingly the invention relates to an edible water-in-oil emulsion comprising
  a fat-phase comprising a first hardstock and a second hardstock,
    wherein said fat-phase has a total amount of hardstock of from 2 to 60 wt. %, based on the total weight of the fat-phase, and
  a water-phase,
    wherein part of the water-phase is dispersed as droplets, wherein the droplets are stabilized by said first hardstock;
    and wherein part of the water-phase is dispersed as droplets, wherein the droplets are stabilized by said second hardstock,
    wherein said first hardstock comprises
      more than 25% of HHH-triglycerides, and
      a combined amount of H2U and H2M triglycerides of not more than 110% of the HHH-triglycerides of said first hardstock,
    wherein said second hardstock comprises
      less than 22% of HHH-triglycerides, and
      a combined amount of H2U and H2M triglycerides of more than 140% of the HHH-triglycerides of said second hardstock,
  wherein H denotes saturated chains with 16 or more carbon atoms or an elaidic acid residue, wherein U denotes unsaturated chains and wherein M denotes saturated chains with 14 or less carbon atoms.

DETAILED DESCRIPTION OF THE INVENTION

Weight percentage (wt. %) is based on the total weight of the composition unless otherwise stated. The terms 'fat' and 'oil' are used interchangeably. Where applicable the prefix 'liquid' or 'solid' is added to indicate if the fat or oil is liquid or solid at ambient temperature as understood by the person skilled in the art. The term 'structuring fat' or 'hardstock fat' refers to a fat that is solid at ambient temperature.

Hardstock fat in a W/O emulsion is predominantly present in the form of fat-crystals. A conventional W/O emulsion comprises hardstock fat-crystals with a more-or-less homogenous triglyceride composition. In contrast, the emulsion according to the invention comprises fat-crystals with a triglyceride composition according to a first hardstock and fat-crystals with a triglyceride composition according to a second hardstock. Therefore, the emulsion according to the invention comprises at least two types of fat-crystals with a different triglyceride composition. The W/O emulsion according to the invention comprises fat-crystals with more than 25% of HHH triglycerides and fat-crystals with less than 22% of HHH triglycerides. In case a W/O emulsion comprises at least two populations of fat-crystals with a different triglyceride composition, said W/O emulsion is said to comprise non co-crystallized hardstock.

The presence of non co-crystallized hardstock may be determined by the presence of at least two diffraction peaks when the Full Width at Half Maximum (FWHM) of the first order long spacing X-ray diffraction peak is derived from the Small Angle X-ray Scattering measurement (SAXS) of the W/O emulsion. A mixture of two separately crystallized fat components typically results in more than one diffraction peak.

Full Width at Half Maximum (FWHM)

The Full Width at Half Maximum (FWHM) of the first order long spacing X-ray diffraction peak of the W/O emulsion according to the invention is derived from the Small Angle X-ray Scattering measurement (SAXS) of the emulsion. The FWHM used, is the FWHM that has been corrected for instrumental line broadening. By correcting for the equipment dependent instrumental line broadening the FWHM is made equipment independent.

Instrumental line broadening is accounted for by correcting the measured FWHM of the W/O emulsion with the FWHM of a reference material. For the correction, the FWHM values as measured for the emulsion are corrected by subtracting the FWHM value of the reference material. For the purpose of the present invention the instrumental line broadening is determined by measuring the 1 1 1 Si reflection of NIST Standard Reference Material 640.

Differential Scanning Calorimetry

The presence of non co-crystallized hardstock may also be determined by using differential scanning calorimetry. However, this method is less sensitive and may not show clearly distinctive fat-peaks in all cases, even though non co-crystallized fat is present. Typically a W/O emulsion comprising non co-crystallized hardstock will show at least two distinct fat peaks in a differential scanning calorimetry (DSC) curve. In this specification by 'peak in the DSC-curve' is meant an absolute or relative maximum in the DSC-curve. The term 'fat peak' is intended to exclude those peaks or parts of peaks which are not attributable to the fat part of the product. Preferably the W/O emulsion according to the invention shows at least two fat peaks in a DSC curve and more preferably one of those fat peaks is observed below, and one of which is observed above a temperature of 38 degrees Celsius.

Water-Phase Droplets Stabilized by Hardstock

The water-droplets in a W/O emulsion are stabilized by hardstock fat in the form of fat-crystals. The stabilization prevents coalescence of the droplet with other droplets and the release of the content of the water droplet. It is believed, the fat-crystals form a 'shell' around each water-droplet thereby stabilizing it. The W/O emulsion according to the invention comprises droplets stabilized by a first hardstock and droplets stabilized by a second hardstock. Therefore, said droplets are believed to be stabilized by a 'shell' of fat-crystals with a triglyceride composition according to the first hardstock or a 'shell' of fat crystals with a triglyceride composition according to the second hardstock. It will be appreciated that for a droplet to be considered stabilized by either hardstock a small amount of fat-crystals of the other hardstock may be present in the shell surrounding the droplet without significantly affecting said stabilization. For example, a droplet surrounded by 95% fat-crystals derived from the first hardstock and 5% fat-crystals derived from the second hardstock will be considered stabilized by the first hardstock.

The presence of droplets stabilized by either the first or the second hardstock provides a W/O emulsion according to the invention having good stability, oral response and little or no waxiness.

Preferably at least part of the water droplets stabilized by the second hardstock release at least part of their content at in-mouth conditions. Typically said droplets comprise at least one taste compound such as a salt.

Preferably at least part of the droplets stabilized by the first hardstock will retain at least part of their content at in-mouth conditions.

The presence of droplets stabilized by the first hardstock may be observed by gradually warming-up the W/O emulsion and analyzing the release of the water-phase at different temperatures. For example, a sample of the emulsion may be placed in water or any other suitable buffer solution and the content of the buffer solution analyzed at different temperatures. It will be appreciated that in a W/O emulsion according to the invention most of the water-phase stabilized by the second hardstock is released at a lower temperature than most of the water-phase stabilized by the first hardstock. Preferably the W/O emulsion according to the invention comprises water droplets stabilized by the first hardstock which release most of their content at a temperature above 38 degrees Celsius.

Product Formats

The emulsion according to the invention should not be subjected to conditions which lead to a substantial substitution of fat-crystals stabilizing different water-droplets prior to consumption. Furthermore, the emulsion should not be subjected to conditions which lead to a substantial homogenization of the triglyceride composition of the fat-crystals prior to consumption. For example, the emulsion according to the invention should not be exposed to temperatures which lead to a complete melting of the hardstock such as occurs during baking in the oven. The W/O emulsion according to the invention is especially suitable for use as a ready-to-eat spread, such as for spreading on bread or toast.

The W/O emulsion according to the invention preferably is a wrapper or a spread, more preferably a low-fat spread comprising at most 40 wt. %, even more preferably at most 30 wt. % and most preferably at most 25 wt. % of fat. The W/O emulsion according to the invention preferably further comprises at least 60 wt. %, even more preferably at least 70 wt. % and most preferably at least 75 wt. % of a water-phase based on the total weight of the W/O emulsion. The W/O emulsion according to the invention comprises at least 20 wt. % of fat and at most 80 wt. % of a water-phase.

Hardstock Composition

The W/O emulsion according to the invention comprises a first and a second hardstock.

The second hardstock according to the invention comprises less than 22% of HHH-triglycerides, and a combined amount of H2U and H2M triglycerides of more than 140% of the HHH-triglycerides of said second hardstock. An example of a suitable second hardstock source is an interesterified mixture of 65% dry fractionated palm oil stearin with an Iodine Value of 14 and 35% palm kernel oil, which has 20% of HHH and a combined amount of H2U and H2M triglycerides of 39%. The triglyceride composition of the second hardstock is such that at least part of the droplets stabilized by the second hardstock will release their content at in-mouth conditions. Preferably, the second hardstock comprises from 2 to 20%, more preferably from 5 to 18% and most preferably from 10 to 15% of HHH triglycerides.

The first hardstock according to the invention comprises more than 25% of HHH-triglycerides, and a combined amount of H2U and H2M triglycerides of not more than 110% of the HHH-triglycerides of said first hardstock. An example of a suitable first hardstock source is palm oil hardened to a slip melting point of 58 degrees Celsius, which has 95% of HHH and a combined amount of H2U and H2M triglycerides of 4%. Preferably the first hardstock comprises at least 30%, more preferably at least 50% and most preferably at least 70% of HHH-triglycerides. Preferably the first hardstock has a solid fat content at 30 degrees Celsius which differs at most 10%, preferably at most 7%, most preferably at most 5% from the solid fat content of said first hardstock at 40 degrees Celsius.

Preferably the W/O emulsion according the invention comprises from 2 to 58 wt. %, more preferably from 6 to 50 wt. %, even more preferably from 10 to 40 wt. % and most preferably from 25 to 30 wt. % of said second hardstock based on the total weight of fat.

Preferably the W/O emulsion according the invention comprises from 2 to 58 wt. %, more preferably from 6 to 50 wt. %, even more preferably from 10 to 40 wt. % and most preferably from 25 to 30 wt. % of said first hardstock based on the total weight of fat.

Preferably the W/O emulsion according to the invention comprises a total amount of hardstock from 5 to 50 wt. %, more preferably from 10 to 40 wt. %, even more preferably from 12 to 30 wt. % and most preferably from 15 to 20 wt. % based on the total weight of fat.

The hardstock of W/O emulsions according to the invention generally comprise conventional oils and fats which may be of both animal and vegetable origin. Examples of sources of conventional oils and fats include, optionally fractions of, coconut oil, palmkernel oil, palm oil, marine oils, lard, tallow fat, butter fat, soybean oil, safflower oil, cotton seed oil, rapeseed oil, poppy seed oil, corn oil, sunflower oil, olive oil, algae oil and blends thereof. Hydrogenation may be used to alter the degree of unsaturation of the fatty acids and as such to alter the fatty acid composition. A drawback of hydrogenation, especially of partial hydrogenation, is the formation of by products like e.g. trans fatty acids. Interesterification retains the fatty acid composition but alters the distribution of the fatty acids over the glycerol backbones. Enzymatic interesterification introduces additional process steps which may be complicated and introduce additional costs. Furthermore some consumers perceive chemically modified fats as unnatural and therefore undesirable. Preferably the W/O emulsion of the invention comprises hardstock which does not contain fully hydrogenated fats, partially hydrogenated fats or interesterified fats. Preferably the W/O emulsion of the invention comprises only natural fats.

For the purpose of this specification H denotes saturated chains with 16 or more carbon atoms or an elaidic acid residue, U denotes unsaturated chains and M denotes saturated chains with 14 or less carbon atoms. An elaidic residue is a C18:1 trans unsaturated fatty acid. It will be appreciated that for a W/O emulsion according to the invention a HHH-triglyceride is not equal to a H2U-triglyceride. Preferably H denotes saturated chains with 16 or more carbon atoms and U denotes cis-unsaturated fatty acids.

Examples of H chains (i.e. fatty acid residues) are palmitic acid (C16:0) and stearic acid (C18:0). Examples of U chains are oleic acid (C18:1) and linoleic acid (C18:2). Examples of M chains are lauric acid (C12:0) and capric acid (C10:0). For example, a triglyceride comprising two stearic acid residues and one palmitic acid residue forms an HHH-triglyceride. For example, a triglyceride comprising 2 palmitic acid residues (P) and one oleic acid residue (O) forms a H2U triglyceride. The terms H2U and H2M encompass any order of the fatty acid residue on the glycerol backbone. For example, PPO and POP are both H2U triglycerides. The first and second hardstock are characterized by their triglyceride composition, wherein % indicates the relative weight amount.

Liquid Oil

The oil in the W/O emulsion according to the invention may be a single oil or a mixture of different oils, and may comprise other components. Preferably at least 50 wt. % of the oil (based on total amount of oil) is of vegetable origin, more preferably at least 60 wt. %, even more preferably at least 70 wt. %, still more preferably at least 80 wt. %, even still more preferably at least 90 wt. % and even still more further preferably at least 95 wt. %. Most preferably the oil essentially consists of oil of vegetable origin. The liquid oil fraction preferably comprises unmodified vegetable oil such as soybean oil, sunflower oil, linseed oil, low erucic rapeseed oil (Canola), corn oil (maize oil), olive oil, algae oil and blends of vegetable oils. For the purpose of this invention algae are considered vegetables.

Water-Phase

The water-phase in a W/O emulsion according to the invention is partly dispersed as droplets, stabilized by the first hardstock; and partly dispersed as droplets stabilized by the second hardstock. Preferably the ratio of droplets stabilized by the first hardstock to droplets stabilized by the second hardstock is from 0.01:1 to 1:0.01, more preferably from 0.1:1 to 1:0.1, even more preferably from 0.5:1 to 1:0.5, even more preferably from 0.75:1 to 1:0.75 and most preferably is from 0.95:1 to 1:0.95. It will be appreciated that the droplets stabilized by either hardstock are distributed more- or less homogeneously throughout the emulsion. Said distribution should at least be to such a degree that the droplets stabilized by either hardstock will both be present in the mouth during consumption (e.g. are both present on a spoon when used to sample the W/O emulsion according to the invention). Preferably, the droplets stabilized by either hardstock are homogeneously distributed throughout the emulsion.

The water-phase may comprise ingredients like for example salt, acidifying agent and/or preservative. The water-phase may also comprise oil, for example to aid the inclusion of hydrophobic ingredients in the water-phase. The water-phase may also comprise proteins and non-gelling protein, like for example dairy protein. The water-phase may also comprise commonly known gelling and/or thickening agents and include for example polysaccharides like starches, vegetable gums and pectin as well as proteins suitable for such use like gelatine. Preferably the gelling and/or thickening agent are selected from the group consisting of physically or chemically modified starch, gelatine and combinations thereof.

It has surprisingly been found that the W/O emulsion according to the invention is suitable to formulate compounds resulting in an undesirable taste and/or compounds resulting in a desirable taste when present in the water-phase while still providing a good oral response and stability and having a little or no waxiness.

Reduction of Undesirable Taste

The W/O emulsion according to the invention preferably comprises one or more health promoting compounds, which are broadly defined as compounds which maintain and/or improve health and/or sense of well-being, such as caffeine and vitamin C. Unfortunately many of such compounds result in an undesirable taste when added to conventional W/O emulsions.

Preferably a W/O emulsion according to the invention comprises at least one health promoting compound in a concentration of from 0.01 to 10 wt. %, preferably from 0.1 to 5 wt. %, more preferably from 0.2 to 3 wt. % and most preferably from 0.5 to 2 wt. %. Surprisingly it has been found that the W/O emulsion according to the invention with a low waxiness and good oral response may also reduce the undesirable taste of a compound when present in the droplets stabilized by the first hardstock.

Preferably the W/O emulsion according to the invention comprises water droplets stabilized by said first hardstock, wherein said droplets comprise at least one health promoting compound having an undesirable taste, wherein the compound is selected from the group of a vitamin, mineral, peptide and flavonoid; and most preferably wherein said selected compound is a water-soluble compound.

More preferably the W/O emulsion according to the invention comprises water droplets stabilized by said first hardstock, wherein said droplets comprise at least one health promoting compound having an undesirable taste, wherein the compound is selected from the group of a polyphenol, glucosinolate, calcium, magnesium, phosphorus, potassium, sulfur, chromium, cobalt, copper, fluorine, iodine, iron, manganese, molybdenum, selenium, zinc, flavanone, flavonol, flavone, isoflavone, flavan, anthocyanin, valyl-proline-proline, isoleucine-proline-proline and leucine-proline-proline; and most preferably wherein said selected compound is a water-soluble compound.

Preferably at least 20 wt. %, preferably at least 40 wt. %, more preferably at least 60 wt. %, even more preferably at least 80 wt. % and most preferably at least 95 wt. % of a compound having an undesirable taste is present in the water droplets stabilized by said first hardstock.

It will be appreciated that preferably most and more preferably all of the compounds having an undesirable taste are present in the droplets stabilized by the first hardstock. It will be further appreciated that for the reduction of undesirable taste the droplets stabilized by the second hardstock may have an empty water-phase (i.e. contain only water).

Preferably in the W/O emulsion according to the invention from 5 to 80 vol. %, more preferably from 10 to 70 vol. %, even more preferably from 20 to 60 vol. % and most preferably from 40 to 50 vol. % of the total water-phase is dispersed as droplets stabilized by the first hardstock.

Enhancement of Desirable Taste

The W/O emulsion according to the invention preferably comprises one or more compounds which have or result in a desirable taste. Unfortunately many of such flavour compounds are expensive and/or unhealthy. An example of the former is vanilla extract. An example of the latter is sodium chloride which provides saltiness, but the excessive consumption of which is associated with high blood pressure.

Preferably the edible water-in-oil emulsion according to the invention comprises water droplets stabilized by said second hardstock, wherein said droplets comprise at least one compound having a desirable taste, more preferably a compound having a desirable taste is selected from the group of sodium chloride, monosodium glutamate, vanilla extract, yuzu, lemon juice, dairy flavour compounds, fermented milk flavour compounds, trigeminal compounds, protein, sugar and most preferably wherein said selected compound is a water-soluble compound.

Surprisingly it has been found that the W/O emulsions according to the invention with little or no waxiness and good stability may selectively enhance the taste of compounds present in the droplets stabilized by the second hardstock. With taste enhancement is indicated that a same amount of a flavor compound formulated in a conventional votator made W/O emulsion and in a W/O emulsion according to the invention will be perceived as being present in a higher amount in the latter. To provide taste enhancement at least 55 wt. %, preferably at least 65 wt. %, more preferably at least 75 wt. %, even more preferably at least 85 wt. % and most preferably at least 95 wt. % of a compound having a desirable taste is present in the water droplets stabilized by said second hardstock.

It will be appreciated that for taste enhancement essentially all of a compound with a desirable taste may be present in the droplets stabilized by the second hardstock and that the droplets stabilized by the first hardstock may have an empty water-phase (i.e. contain only water).

Said selective taste enhancement allows for a reduction in the amount of flavor compound required to provide good flavoring or simply to provide a more intense flavor perception by the consumer.

Preferably in the W/O emulsion according to the invention from 5 to 80 vol. %, more preferably from 10 to 70 vol. %, even more preferably from 20 to 60 vol. % and most preferably from 40 to 50 vol. % of the total water-phase is dispersed as droplets stabilized by the second hardstock.

It will be appreciated that the classification of a compound as having a neutral, undesirable or desirable taste may depend on the specific application and/or intended use (e.g. fishy taste in ice-cream versus in fish-soup).

Process to Manufacture W/O Emulsions According to the Invention

We have found that the water-in-oil emulsion according to the invention can be manufactured in a process comprising the steps of:

a. providing a first water-in-oil emulsion comprising a water-phase dispersed as droplets, wherein said droplets are stabilized by a first hardstock comprising more than 25% of HHH-triglycerides; and further comprising a combined amount of H2U and H2M triglycerides of not more than 110% of the HHH-triglycerides of said first hardstock;

b. providing a second water-in-oil emulsion comprising a water-phase dispersed as droplets, wherein said droplets are stabilized by a second hardstock comprising less than 22% of HHH-triglycerides; and further comprising a combined amount of H2U and H2M triglycerides of more than 140% of the HHH-triglycerides of said second hardstock;

c. mixing of the first and second water-in-oil emulsion, wherein H denotes saturated chains with 16 or more carbon atoms or an elaidic acid residue, wherein U denotes unsaturated chains and wherein M denotes saturated chains with 14 or less carbon atoms.

Fat-Powder

Preferably the first W/O emulsion is made in a process using fat-powder comprising structuring fat and most preferably both the first and second W/O emulsion are each made in a process using fat-powder comprising structuring fat (a.k.a. hardstock). The use of said fat-powder provides improved selectivity of water-phase release, improved oral response, reduced waxiness and improved stability of the W/O emulsion according to the invention.

The use of fat-powder comprising structuring fat in a process to manufacture the first or second W/O emulsion comprises the mixing of said fat-powder, oil and a water-phase. The mixing of ingredients may be done in any order.

The fat-powder comprises structuring fat and preferably comprises at least 80 wt. % of structuring fat, more preferably at least 85 wt. %, even more preferably at least 90 wt. %, still more preferably at least 95 wt. % and most preferably at least 98 wt. %. Most preferably the edible fat-powder essentially consists of structuring fat.

Preferably, the fat-powder is micronized fat and more preferably said micronized fat is made by a method such as Super Critical Melt Micronisation (ScMM), also known as particles from gas saturated solutions (PGSS). This is a commonly known method and is for example described in J. of Supercritical Fluids 43 (2007) 181-190 and EP1651338.

It is important that the fat-powder is not subjected to temperatures at which the structuring fat melts as this may severely reduce the ability of the structuring fat to enhance the stability of the W/O emulsion according to the invention. The temperature at which the structuring fat melts depends on the structuring fat as used and can routinely be determined for example based on the solid fat content profile (i.e. N-lines) of the structuring fat.

Incorporation of Compounds in the Water-Phase

Said first and second W/O emulsions are each made in a process involving the mixing of a water-phase and a fat-phase. Compounds resulting in an undesirable taste are preferably incorporated in the water-phase of the first W/O emulsion to reduced said taste release at in-mouth conditions. Compounds having a desirable taste are preferably incorporated into the water-phase of the second W/O emulsion to enhanced said taste. Compounds may be suitably incorporated into the water-phase before mixing with the fat-phase. For example, in case of hydrophilic compounds, said incorporation may involve simply dissolving compounds in the water-phase. For example, in case compounds form insoluble particles, said particles may be mixed with the water-phase to form a suspension. The presence of emulsifiers or gelling and/or viscosity enhancing agents may suitably be used to keep said particles in suspension in the water-phase. For example, in case compounds are fat-soluble, their incorporation into the water-phase may involve oil droplets suspended into the water-phase. In the latter case an O/W/O emulsion is formed comprising a continuous oil phase with a water-phase dispersed as droplets wherein the water droplets themselves comprise dispersed oil droplets comprising the oil soluble compound.

Mixing

The relative amounts of the first and the second W/O emulsion which may suitably be mixed to provide a W/O emulsion according to the invention may vary. Preferably the amount of the first W/O emulsion to the second W/O emulsion in the mixture is from 0.01:1 to 1:0.01, more preferably is from 0.1:1 to 1:0.1, even more preferably is from 0.5:1 to 1:0.5, still even more preferably is from 0.75:1 to 1:0.75 and most preferably is from 0.95:1 to 1:0.95.

The conditions during mixing of the first and second W/O emulsion can influence the properties of the final W/O emulsion to a large degree. Short residence times, low temperature during mixing and/or low shear favour the formation of a W/O emulsions according to the invention comprising droplets stabilized by either the first or second hardstock.

It will be appreciated that the temperature during mixing of the first and second W/O emulsion should be well below typical in-mouth temperatures. Preferably, the first and the second W/O emulsion are mixed at a temperature from 1 to 25, more preferably from 3 to 20, and most preferably from 5 to 15 degrees Celsius.

The shear rate and the intensity of mixing should be low in order to prevent substitution of fat-crystals of the first hardstock with fat-crystals of the second hardstock in the shell of fat-crystal stabilizing a droplet. For example, the first and the second W/O emulsion can be suitably mixed by hand using a bowl and spatula. For example, the first and second W/O emulsion can be mixed in a pin-stirrer, with an internal volume of 0.5 L, at a residence time of 20 seconds and at rpm 50. For example the first and second W/O emulsion can be mixed in a static mixer (Kenics-type) with internal diameter of 10 mm (Sulzer, CH) comprised of 6 elements, each having 6 blades at a flow-rate of 200 kg/h. For example the W/O emulsion may be build up by putting layers of between 0.1 and 3 mm height of the first emulsion and second emulsion on top of each other, without need for any mixing device. For example the first and second emulsion may be mixed inline simply by bringing both streams together in a narrow tube.

Suitably the first and second W/O emulsions are mixed to provide a coarse W/O emulsion according to the invention. It will be appreciated that the degree of mixing of the first and second W/O emulsion should be such that both the first and second emulsion will be both be present in the mouth during consumption (e.g. are both present on a spoon when used to sample the W/O emulsion according to the invention).

Typically the first W/O emulsion has a greater viscosity than the second W/O emulsion at mixing temperature. Therefore, mixing may result in dispersion of the first W/O emulsion as globules in the second emulsion. Typically, the applied shear and/or time of mixing will determine the globule size. Preferably the extend of mixing of the first and second W/O emulsion results in a W/O emulsion according to the invention wherein the first W/O emulsion is present mainly as globules from 30 to 10000 micrometer, more preferably from 50 to 5000 micrometer and most preferably from 100 to 2000 micrometer.

In a further aspect the invention relates to the products according to the invention as described herein obtainable by the process according to the invention as described herein, like for example a process wherein fat-powder comprising structuring fat is used.

The invention is now illustrated by the following non limiting examples.

EXAMPLES

Rheolqy Measurement

The waxiness of the W/O emulsions was measured with a TAAR2000 rheometer (TA Instruments), and a 40 mm parallel sandblasted plate (500 µgap) geometry in continuous oscillation at a constant frequency (5 Hz) and a controlled strain of 10%. The storage (G') and loss (G") moduli where determined wherein the G' and G" were measured during a temperature sweep of the W/O emulsion. A 0.7 gram sample of a W/O emulsion was placed on bottom plate of the rheometer and equilibrated to 10 degrees Celsius. Next the sample temperature was raised from 10 to 60 degrees Celsius and lowered back down again to 10 degrees Celsius. The temperature was changed in steps of 0.5 degrees Celsius and at each step the sample was maintained for 3 seconds. The loss modulus was determined at 30, 35, 40 and 45 degrees Celsius.

Waxiness

The waxiness of a W/O emulsion was also assessed by a panel of 10 people. The W/O emulsion were classified from 0 to 5, wherein:

0 indicates a very waxy product which tends to stick in the mouth.

5 indicates a very good melting, oral response and no perceivable waxiness.

Taste

The taste of W/O emulsions were assessed by panel of 10 people. The W/O emulsion were classified from 0 to 5, wherein:

0 indicates no taste and/or strong undesirable taste.

5 indicates a good release of desirable taste and no undesirable taste.

Oral Response

A good oral response of the W/O emulsion is associated with the destabilization of at least part of the droplets at in-mouth conditions and release of at least part of the water-phase. The destabilization of droplets at specific temperature can be observed under a microscope equipped with a Peltier element and a temperature cell to allow for temperature control of the sample.

Microscope and instrumentation used:
(1) Carl Zeiss Axioskop Universal Microscope (Zeiss LD Epiplan 10×/0,25DIC)
(2) 0.01 mm sample holder, object glass
(3) Sony Video Camera DFW-SX900/Dell Computer (Fire-I capture software)
(4) Linkam LTS120 Large Sample Peltier Stage (CO102, LTS-PE94-controller)

The following types of observations were noted:
(1) First droplets coalescing (first signs of collapsing of tiny droplets)
(2) A lot of Coalescence, starting to break
(3) Start Flowing, start collapsing
(4) Complete Collapse starting)
(5) Completely broken, hardly any change anymore Release of Water-Phase Content A sample of 1 gram of a W/O emulsion is placed in a sample holder. The holder is made of semi-permeable material allowing for the diffusion of ions. The sample holder is itself placed in to a double walled glass vessel containing 130 millilitre of nano pure water of about 20 Degrees Celsius, which is stirred at constant speed. The cooling medium flowing through the double wall was thermostated by a Lauda laboratorium water bath. The temperature program of the water bath was as follows:
(1) From 20 to 30 Degrees Celsius at 1 Degrees Celsius per minute
(2) From 30 to 50 Degrees Celsius at 0.2 Degrees Celsius per minute
(3) From 50 to 70 Degrees Celsius at 1 Degrees Celsius per minute The conductivity of the water-system was monitored throughout the program and expressed as Ohm per cm.

At regular intervals during the program a water sample was analyzed to determine the type of salt and the salt concentration using Inductively Coupled Plasma Mass Spectrometry.

Differential Scanning Calorimetry

For the DSC analysis a Perkin Elmer DSC8000 was equipped with a controlled cooling accessory, the Intracooler III. For each DSC analysis, 20 to 40 mg of a W/O emulsion was placed into a sample pan.

TABLE 1

DSC parameters

| | |
|---|---|
| Apparatus | Perkin Elmer DSC8000 equipped with a the Intracooler III |
| Sample pan | Stainless steel sample pan. |
| Sample preparation | Sample weights are between 20 and 40 mg. |
| DSC measurement | 1. Hold for 1 min at 5° C.<br>2. Heat from 5° C. to 80° C. at 10° C./min. |

The enthalpy ($\Delta H$; J/g) is measured by the peak area and the weight of a sample. The maximum peak temperature is taken for each identified fraction of the total area.

Water Droplet Size Distribution of Spreads (D3,3 Measurement)

The normal terminology for Nuclear Magnetic Resonance (NMR) is used throughout this method. On the basis of this method the parameters D3,3 and exp($\sigma$) of a lognormal water droplet size distribution can be determined. The D3,3 is the volume weighted mean droplet diameter and a (i.e. e^sigma) is the standard deviation of the logarithm of the droplet diameter.

The NMR signal (echo height) of the protons of the water in a water-in-oil emulsion are measured using a sequence of 4 radio frequency pulses in the presence (echo height E) and absence (echo height E*) of two magnetic field gradient pulses as a function of the gradient power. The oil protons are suppressed in the first part of the sequence by a relaxation filter. The ratio (R=E/E*) reflects the extent of restriction of the translational mobility of the water molecules in the water droplets and thereby is a measure of the water droplet size. By a mathematical procedure—which uses the log-normal droplet size distribution—the parameters of the water droplet size distribution D3,3 (volume weighed geometric mean diameter) and a (distribution width) are calculated.

A Bruker magnet with a field of 0.47 Tesla (20 MHz proton frequency) with an air gap of 25 mm is used (NMR Spectrometer Bruker Minispec MQ20 Grad, ex Bruker Optik GmbH, DE).

A spread was measured according to the above described procedure, after being stored at 5 degrees Celsius for one week after production. This gives the D3,3 of table 6. To obtain more information about the heat stability, a sample of a spread was subjected to a specific temperature for a certain time. The droplet size of a spread-sample was measured after being stored at 35 Degrees Celsius for one hour (D3,3 1 h 35), of a sample stored for 2 days at 35 degrees Celsius (D3,3 2 d 35) and of a sample stored for 2 days at 30 degrees Celsius and an additional 3 hours at 40 degrees Celsius (D3,3 2 d 30+3 h 40). The results of the droplet size measurements are shown in table 7.

Stevens Value

Stevens values indicates a products hardness or firmness. The Stevens value was measured with a Stevens penetrometer (Brookfield LFRA Texture Analyser (LFRA 1500), ex Brookfield Engineering Labs, UK) equipped with a stainless steel probe with a diameter of 6.35 mm and operated in "normal" mode. The probe is pushed into the product at a speed of 2 mm/s, a trigger force of 5 gram from a distance of 10 mm. The force required is read from the digital display and is expressed in grams. The Stevens value was determined of freshly prepared spreads at 5 degrees Celsius.

Spreadibility

A flexible palette knife was used to spread a small amount of a spread on fat free paper. The resulting spreading screen was evaluated according to a standardized scale. A score of 1 represents a homogeneous and smooth product without any defects, a 2 indicates observable small spreading defects such as slightly inhomogeneous spreading or the presence of some vacuoles, a 3 indicates clearly observable defects, such as the appearance of free water or coarseness during spreading. A score of 4 or 5 refers to unacceptable products, where a 4 indicates a product which still has some spreading properties, but with an unacceptable level of defects.

Free Water

After spreading a sample of a fat spread, the presence of free water was determined by using indicator paper (Wator, ref 906 10, ex Machery-Nagel, DE) which develops dark spots where free water is absorbed.

A six point scale is used to quantify the quality of fat spread (DIN 10 311):
- 0 (zero) is a very stable and good product showing no perceivable coloring of the paper;
- 1 (one) some lose of moisture (one or two spots, or the paper changes a little in color as a total);
- 2 (two) as one but more pronounced;
- 3 (three) as one but with a clear spots and color change of the paper;
- 4 (four) indicator paper completely changes into a darker color;
- 5 (five) the paper darkens completely and fast into the maximum level of color intensity.

Spreads with a score of 4 or 5 have an unacceptable level of free water. Spreads with a score of 0 or 1 have an acceptable occurrence of free water.

W/O Emulsion Production

The compositions of the W/O emulsion used in the experiments are set out in table 1.

TABLE 1

Composition of the W/O emulsions used in the experiments, numbers represent wt. %.

|  | Comp. A | Comp. B | Comp. C | Ex. 1 | Comp. D | Ex. 2 | Comp. E |
|---|---|---|---|---|---|---|---|
| FAT PHASE |  |  |  |  |  |  |  |
| Fat powder A | 4.00 | 4.00 | — | 2.00 | — | 1.00 | 2.00 |
| Fat powder B | — | — | 4.40 | 2.20 | — | 3.30 | 2.20 |
| Fat powder C | — | — | — | — | 4.17 | — | — |
| dimodan HP | 0.10 | 0.10 | — | 0.05 | 0.05 | 0.025 | 0.05 |
| dimodan RT | — | — | 0.30 | 0.15 | 0.16 | 0.225 | 0.16 |
| B-caroten 1% | 0.07 | 0.07 | 0.07 | 0.07 | 0.07 | 0.07 | 0.07 |
| Sunflower oil | 34.83 | 34.83 | 34.23 | 34.53 | 34.56 | 34.38 | 34.56 |
| WATER-PHASE |  |  |  |  |  |  |  |
| NaCL | 0.50 | 0.50 | 0.50 | 0.50 | 0.50 | 0.50 | 0.50 |
| KCL | 7.50 | 15.00 | — | 3.75 | 3.75 | 3.75 | 3.75 |
| citric acid 20% | 0.01 | 0.01 | 0.01 | 0.01 | 0.01 | 0.01 | 0.01 |
| Water | Balance | Balance | Balance | Balance | Balance | Balance | Balance |

Hardstock in the form of fat powders A to C was obtained using a supercritical melt micronisation process similar to the process described in Particle formation of ductile materials using the PGSS technology with supercritical carbon dioxide, P. Muniiklii, Ph.D. Thesis, Delft University of Technology, 16-12-2005, Chapter 4, pp. 41-51. Fat powder A consists of PO58: a fully hydrogenated Palm Oil. Fat powder B consists of inES48: an interesterified mixture of 65% dry fractionated palm oil stearin with an Iodine Value of 14 and 35% palm kernel oil. Fat powder C was made of a mixture of 48 percent PO58 and 52 percent inES48.

TABLE 2

Triglyceride composition of the hardstock in %

|  | Hardstock | | |
|---|---|---|---|
|  | A | B | C |
| HHH-triglycerides | 95.4 | 19.8 | 56.1 |
| H2U-triglycerides | 4.1 | 26.4 | 15.7 |
| H2M-triglycerides | — | 12.7 | 6.6 |

Spreads Production Process

For each of Comparatives A to E, all water-phase ingredients were dissolved at a temperature of 60 degrees Celsius and the water-phase was subsequently pasteurized. The water-phase was pumped through a tubular heat exchanger and cooled to 6-8 degrees Celsius just before mixing with the fat mixture.

The fat mixture was made by dispersing colorant and the stock solution of the emulsifier at about 55 degrees Celsius in liquid oil. The liquid oil was cooled to 14 degrees Celsius and subsequently the fat-powder, pre-cooled to 5 degrees Celsius, was added. In case of Comparative E a 1:1 mix of fat-powders A and B was used. The oil and fat-powder were homogenized and degassed under vacuum using a Fryma-Delmix colloid mill system. The fat feed tank was thermo-stated at 16 degrees Celsius.

The fat feed tank and the aqueous feed tank feed were pumped via a junction point into a 150 ml double walled stainless steel pin stirrer, with two rows of 4 stator and rotor pins. The pin stirrer is thermo-stated at 8° C. and operated at 2400 rpm.

Example 1 was formed by mixing of part of the emulsions of Comparatives A and C in the ration of 1:1. Example 2 was formed by mixing of part of the emulsions of Comparatives B and C in the ration of 1:3. The mixing to provide Example 1 and Example 2 was done by hand in a bowl using a spatula to provide mild shear. Example 1 and Example 2 are W/O emulsions according to the invention.

Melting Properties and Oral Response

The behaviour of the droplets during controlled heating of the spreads was observed under a microscope (Table 3). It was found that at part of the droplets of Example 1 show coalescence at 33 degrees Celsius, which is indicative of a W/O emulsion having a good oral response.

TABLE 3

Microscopic observations during controlled melting of the fat spreads

| Observation | Comp. A T/° C.[1] | Comp. C T/° C. | Comp. E T/° C. | Comp. D T/° C. | Example 1 T/° C. |
|---|---|---|---|---|---|
| 1 | 41.5 | 31.5 | 31.1 | 43.5 | 33.0 |
| 2 | 45.3 | 38.8 | 39.8 | 43.8 | 41.9 |
| 3 | 46.7 | 41.4 | 42.8 | 41.7 | 43.7 |
| 4 | 48.3 | 43.2 | 44.3 | 45.1 | 45.5 |
| 5 | 53.5 | 48.2 | 46.0 | 46.6 | 49.7 |

[1]The numbers in the column below T/° C. indicate the temperature in degrees Celsius at which for the first time the following types of observations were noted: (1) First droplets coalescing (first signs of collapsing of tiny droplets) (2) A lot of Coalescence, starting to break (3) Start Flowing, start collapsing (4) Complete Collapse starting (5) Completely broken, hardly any change anymore Table 4 shows the waxiness and oral response of the spreads. The W/O emulsions were provided with sodium chloride as a desirable taste. Comparatives A, E, D and Example 1 were provided with potassium chloride as undesirable taste.

TABLE 4

Oral response of the fat spreads

| Phenomena | Comp. A | Comp. C | Comp. E | Comp. D | Example 1 |
|---|---|---|---|---|---|
| Taste (0-5) | 1 | 5 | 0 | 1 | 4 |
| Waxiness (0-5) | 0 | 5 | 1 | 0 | 4 |

Tables 3 and 4 clearly show that the Example 1 has a low waxiness and has a good flavour release in terms of sodium chloride perception with little or no taste of the of potassium chloride. The inventors observed that the waxiness was further reduced in Example 2 when compared to example 1.

Rheoloqy of the W/O Emulsions

In table 5 the rheology of the spreads is shown, measured at 30, 35, 40 and 45 degrees Celsius. The rheology is an indicator of waxiness. A high rheology value indicates a high waxiness.

TABLE 5

Rheology measurements of spreads at various temperatures, wherein T/° C. indicates the temperature in degrees Celsius and Pa indicates the visco-elastic or loss modulus in Pascal.

| T/° C. | Comp. A G" (Pa) | Comp. B G" (Pa) | Comp. C G" (Pa) | Comp. E G" (Pa) | Comp. D G" (Pa) | Ex. 1 G" (Pa) | Ex. 2 G" (Pa) |
|---|---|---|---|---|---|---|---|
| 30 | 1097 | 1068 | 286 | 424 | 491 | 287 | 222 |
| 35 | 1059 | 1035 | 169 | 368 | 440 | 290 | 179 |
| 40 | 623 | 646 | 28 | 177 | 178 | 199 | 94 |
| 45 | 113 | 149 | 0 | 12 | 26 | 22 | 6 |

Table 5 clearly demonstrates that the W/O emulsions according to the invention (Example 1 and 2) have a low rheology value (i.e. low waxiness). Comparatives A, B, D and E, which also comprise high melting hardstock, have a high rheology value. In fact, the rheological properties of Example 1 and Example 2 are similar to Comparative C having no high-melting hardstock at all. Example 1 and Example 2 show good rheological properties.

Stability of the Spreads

In table 6 the average drop size (D3,3), the drop size variance (e^sigma), free-water, hardness and spreading score are shown after production and storage at 5 degrees Celsius for one week. These values are indicative of the quality of the spreads and of the spread stability. A low D3,3, e^sigma, free-water and spreadability indicate a good spread.

Table 6 shows some quality characteristics of the spreads after production.

| | | Comp. A | Comp. C | Comp. E | Comp. D | Example 1 |
|---|---|---|---|---|---|---|
| Stevens value | g | 48 | 52 | 48 | 38 | 34 |
| Spreadability | 1-5 | 1 | 1 | 1 | 1 | 1 |
| Free-Water | 0-5 | 0 | 0 | 0 | 0 | 0 |
| D3,3 | μm | 5.4 | 4.5 | 5.9 | 5.2 | 6.3 |
| e^sigma | | 1.5 | 1.8 | 2.1 | 1.5 | 1.7 |

Example 1 is a W/O emulsion of good quality in terms of the average drop size, e^sigma, occurrence of free water, spreadibility and hardness.

Spreads were exposed to a temperature cycle to determine stability. The droplet size of a spread-sample was measured after being stored at 35 Degrees Celsius for one hour (D3,3 1 h 35), of a sample stored for 2 days at 35 degrees Celsius (D3,3 2 d 35) and of a sample stored for 2 days at 30 degrees Celsius and an additional 3 hours at 40 degrees Celsius (D3,3 2 d 30+3 h 40). The results of the droplet size measurements are shown in table 7.

TABLE 7

D3,3 of spreads after heat treatment.

| | Comp. A | Comp. C | Comp. E | Comp. D | Example 1 |
|---|---|---|---|---|---|
| D3,3 1 h 35 | 5.3 | 5.2 | 5.5 | 4.9 | 6.1 |
| D3,3 2 d 35 | 5.4 | 10.4 | 5.9 | 5.4 | 6.9 |
| D3,3 2 d 30 + 3 h 40 | 5.5 | 48.0 | 6.4 | 5.3 | 7.5 |

Table 7 shows that Example 1 has a good heat stability. In contrast, Comparative C shows very poor stability for some temperature exposures (i.e. a D3,3 above 20 micrometer).

Release of Water-Phase Content

Example 1 was gradually warmed and the release of water-phase constituents released in the buffer solution was monitored. Samples of the buffer solution were analyzed for potassium and sodium concentration. The % release of total potassium or sodium present in the emulsion was calculated. Table 8 shows the % of the potassium and sodium chloride released into the buffer solution at several specific temperatures. Clearly, most of the sodium chloride is released at a lower temperature than most of the potassium chloride. This indicates that droplets stabilized by the second hardstock release their content at a lower temperature that droplets stabilized by the first hardstock.

TABLE 8

Salt type and concentration recalculated on spread formulation

| T/° C. | KCl % | NaCl % |
|---|---|---|
| 34 | 1 | 3 |
| 37 | 1 | 4 |
| 40 | 2 | 14 |
| 43 | 22 | 57 |
| 48 | >99.5 | >99.5 |
| 55 | >99.5 | >99.5 |

Differential Scanning Calorimetry

A DSC curve was made of several spreads and the temperature of the observed fat peak was determined.

TABLE 9

| Fat peaks observed in the DSC-curve | | |
|---|---|---|
| | Peak max. (° C.) | Enthalpy (J/g) |
| Comparative B | 47.7 | 6.3 |
| Example 1 | 44.4 | 3.0 |
| | 28.3 | 1.5 |
| Comparative E | 43.7 | 5.1 |
| Comparative D | 44.1 | 4.4 |
| Comparative C | 21.2 | 0.9 |
| | 37.1 | 2.0 |

Example 1 and Comparative C shows two fat peaks while Comparatives B, D and E show one fat peak. This indicates the presence of non co-crystallized hardstocks in Example 1.

The invention claimed is:

1. An edible water-in-oil emulsion comprising:
a fat-phase comprising a first hardstock and a second hardstock,
wherein said fat-phase has a total amount of hardstock of from 2 to 60 wt. %, based on the total weight of the fat-phase, and
a water-phase,
wherein a first part of the water-phase is dispersed as droplets stabilized by said first hardstock,
and wherein a second part of the water-phase is dispersed as droplets stabilized by said second hardstock,
wherein said first hardstock comprises
more than 25% of HHH-triglycerides, and
a combined amount of H2U and H2M triglycerides of not more than 110% of the HHH-triglycerides of said first hardstock,
wherein said second hardstock comprises
less than 22% of HHH-triglycerides, and
a combined amount of H2U and H2M triglycerides of more than 140% of the HHH-triglycerides of said second hardstock,
wherein each "H" denotes a saturated chain with 16 or more carbon atoms or an elaidic acid residue, each "U" denotes an unsaturated chain and each "M" denotes a saturated chain with 14 or fewer carbon atoms.

2. The edible water-in-oil emulsion of claim 1, wherein the first hardstock comprises at least 30% of HHH-triglycerides.

3. The edible water-in-oil emulsion of claim 1, wherein the first hardstock has a solid fat content at 30 degrees Celsius which at most 7% in the solid fat content of said first hardstock at 40 degrees Celsius.

4. The edible water-in-oil emulsion of claim 1, wherein the second hardstock comprises from 2 to 20% of HHH triglycerides.

5. The edible water-in-oil emulsion of claim 1, wherein the water droplets stabilized by said first hardstock comprise at least one health promoting compound having an undesirable taste, wherein said compound is a vitamin, mineral, peptide or flavonoid.

6. The edible water-in-oil emulsion of claim 1, wherein the water droplets stabilized by said first hardstock comprise at least one health promoting compound having an undesirable taste, wherein said compound is selected from the group of a polyphenol, glucosinolate, calcium, magnesium, phosphorus, potassium, sulfur, chromium, cobalt, copper, fluorine, iodine, iron, manganese, molybdenum, selenium, zinc, flavanone, flavonol, flavone, isoflavone, flavan, anthocyanin, valyl-proline-proline, isoleucine-proline-proline and leucine-proline-proline.

7. The edible water-in-oil emulsion of claim 5, wherein at least 60 wt. % of said health promoting compound having an undesirable taste is present in the water droplets stabilized by said first hardstock.

8. The edible water-in-oil emulsion of claim 1, wherein the water droplets stabilized by said second hardstock comprise at least one compound having a desirable taste selected from the group of sodium chloride, monosodium glutamate, vanilla extract, yuzu, lemon juice, dairy flavour compounds, fermented milk flavour compounds, trigeminal compounds, protein, or sugar.

9. The edible water-in-oil emulsion of claim 8, wherein at least 75 wt. % of said compound having a desirable taste is present in the water droplets stabilized by said second hardstock.

10. The edible water-in-oil emulsion of claim 1, wherein the emulsion is a wrapper or spread comprising at most 25 wt. % of fat.

11. The edible water-in-oil emulsion according to claim 1, wherein the ratio of droplets stabilized by the first hardstock to droplets stabilized by the second hardstock is from 0.75:1 to 1:0.75.

12. A process for manufacturing an edible water-in-oil emulsion comprising:
i. a fat-phase comprising a first hardstock and a second hardstock, wherein said fat-phase has a total amount of hardstock of from 2 to 60 wt. %, based on the total weight of the fat-phase; and
ii. a water-phase, wherein a first part of the water-phase is dispersed as droplets stabilized by said first hardstock and a second part of the water-phase is dispersed as droplets stabilized by said second hardstock;
wherein the method comprises the steps of:
a. providing a first water-in-oil emulsion comprising a water-phase dispersed as droplets, wherein said droplets are stabilized by a first hardstock comprising more than 25% of HHH-triglycerides; and further comprising a combined amount of H2U and H2M triglycerides of not more than 110% of the HHH-triglycerides of said first hardstock;
b. providing a second water-in-oil emulsion comprising a water-phase dispersed as droplets, wherein said droplets are stabilized by a second hardstock comprising less than 22% of HHH-triglycerides; and further comprising a combined amount of H2U and H2M triglycerides of more than 140% of the HHH-triglycerides of said second hardstock;
c. mixing the first and second water-in-oil emulsions to form the edible water-in-oil emulsion,
wherein each "H" denotes a saturated chain with 16 or more carbon atoms or an elaidic acid residue, each "U" denotes an unsaturated chain and each "M" denotes a saturated chain with 14 or fewer carbon atoms.

13. The process of claim 12, further comprising a step of producing the first and/or second water-in-oil emulsion(s) using a fat-powder comprising a structuring fat.

14. The process of claim 13, wherein the fat-powder comprising the structuring fat is produced by super critical melt micronisation.

15. The process of claim 12, wherein the first and second water-in-oil emulsions are mixed in step c) at a temperature of from 5 to 15 degrees Celsius.

16. The process of claim 12, wherein the water droplets stabilized by the first hardstock in the first water-in-oil emulsion comprise at least one health-promoting vitamin, mineral, peptide or flavonoid having an undesirable taste, at a concentration of from 0.5 to 2 wt. %.

17. The process of claim 12, wherein the ratio of droplets stabilized by the first hardstock to droplets stabilized by the second hardstock is from 0.75:1 to 1:0.75.

18. The process of claim 12, wherein the first hardstock has a solid fat content at 30 degrees Celsius which differs at most 7% from the solid fat content of said first hardstock at 40 degrees Celsius.

19. The process of claim 12, wherein the first hardstock comprises at least 50% of HHH-triglycerides and the second hardstock comprises from 10 to 15% of HHH triglycerides; and wherein the edible water-in-oil emulsion formed in step c) comprises at least 20 wt. % of fat and at most 80 wt. % of a water-phase.

20. The process of claim 12, wherein the edible water-in-oil emulsion formed in step c) comprises a fat crystal network comprising fat crystals with more than 25% of HHH triglycerides and fat crystals with less than 22% of HHH triglycerides.

\* \* \* \* \*